United States Patent Office.

G. V. RAMBAUT, OF PETERSBURG, VIRGINIA.

Letters Patent No. 74,940, dated February 25, 1868.

IMPROVED MEDICAL COMPOUND OR BITTERS.

The Schedule referred to in these Letters Patent and making part of the same.

TO ALL WHOM IT MAY CONCERN:

Be it known that I, G. V. RAMBAUT, of the city of Petersburg, county of Dinwiddie, State of Virginia, have invented a new and valuable medicine, which I intend to manufacture under the name of Avoca Bitters; and I do declare that the following is a full description of contents thereof.

To make forty-five gallons of the medicine, I use six pounds ginseng, three pounds orange-peel, five ounces cardamom-seed, and four ounces each of cloves, cinnamon, coriander-seed, Peruvian bark, lavender-flowers, chamomile-flowers, and orris-root, eight ounces of red sanders, six fresh orange-peels, juice from three oranges, one wine-glass of essence of anise, one pint French coloring, and one pint of simple sirup. The above ingredients are steeped in five gallons of alcohol, five gallons of Jamaica spirits, and thirty-five gallons cologne spirits then added.

*Claim.*

I claim the compound made of the materials and substantially as herein described and for the purpose set forth.

G. V. RAMBAUT. [L. S.]

Witnesses:
C. E. WADDELL,
I. C. BRANCH.